(12) United States Patent  (10) Patent No.: US 8,559,852 B2
Hirakawa  (45) Date of Patent: Oct. 15, 2013

(54) ELECTRON EMITTING DEVICE AND DRIVING METHOD THEREOF

(75) Inventor: Hiroyuki Hirakawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 171 days.

(21) Appl. No.: 13/292,364

(22) Filed: Nov. 9, 2011

(65) Prior Publication Data

US 2012/0126716 A1    May 24, 2012

(30) Foreign Application Priority Data

Nov. 19, 2010  (JP) ................................. 2010-259187

(51) Int. Cl.
    *G03G 15/02*    (2006.01)
(52) U.S. Cl.
    USPC ........................... 399/168; 315/291; 313/497
(58) Field of Classification Search
    None
    See application file for complete search history.

(56) References Cited

U.S. PATENT DOCUMENTS

| 8,487,521 B2* | 7/2013 | Hirakawa et al. ............. 313/311 |
| 2010/0278561 A1 | 11/2010 | Kanda et al. |
| 2010/0327730 A1* | 12/2010 | Hirakawa et al. ............. 313/235 |
| 2011/0241532 A1* | 10/2011 | Nagaoka et al. ............. 313/377 |

FOREIGN PATENT DOCUMENTS

| JP | 62-168463 | 7/1987 |
| JP | 1-298623 | 12/1989 |
| JP | 08-203418 | 8/1996 |
| JP | 09-055162 | 2/1997 |
| JP | 2000-243331 | 9/2000 |
| JP | 2001-035354 | 2/2001 |
| JP | 2001-290461 | 10/2001 |
| JP | 2003-338619 | 11/2003 |
| JP | 2009-146891 | 7/2009 |
| JP | 2010-257717 | 11/2010 |

* cited by examiner

*Primary Examiner* — Jany Richardson
(74) *Attorney, Agent, or Firm* — Nixon & Vanderhye, P.C.

(57) ABSTRACT

A driving method of an electron emitting device which includes a first electrode, a particle layer formed on the first electrode and including insulating particles, and a second electrode formed on the particle layer includes: applying a voltage between the first and second electrodes to emit electrons from the first electrode so that the electrons are accelerated through the particle layer and emitted from the second electrode, wherein the applied voltage includes pulses which have a first frequency and are oscillated at a second frequency lower than the first frequency.

21 Claims, 7 Drawing Sheets

FIG. 9 (1)
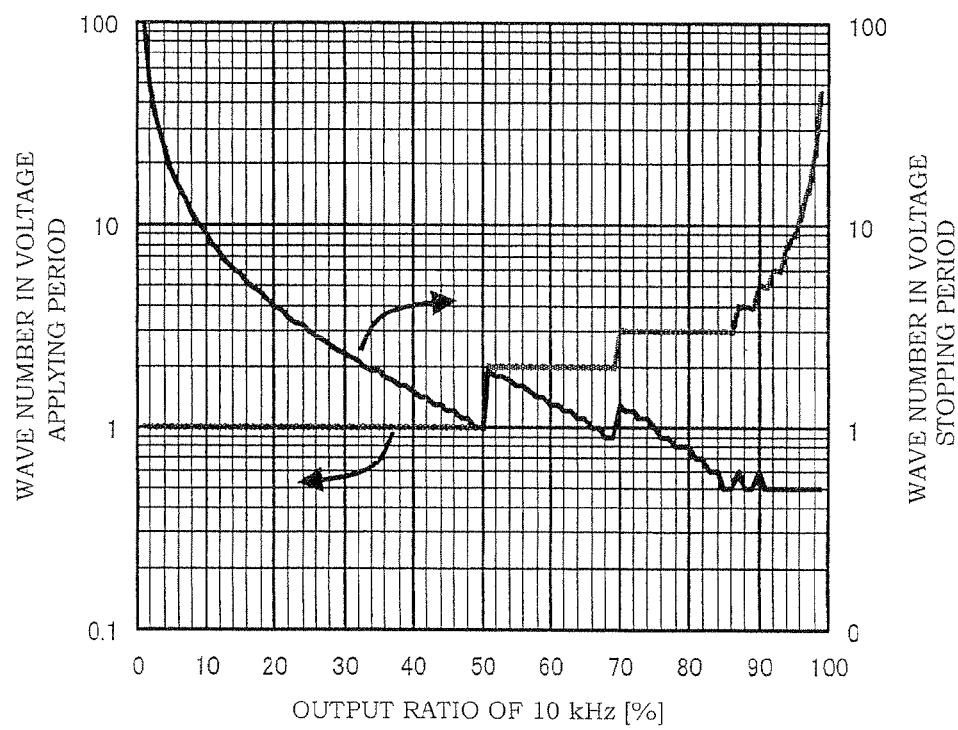
FIG. 9 (2)
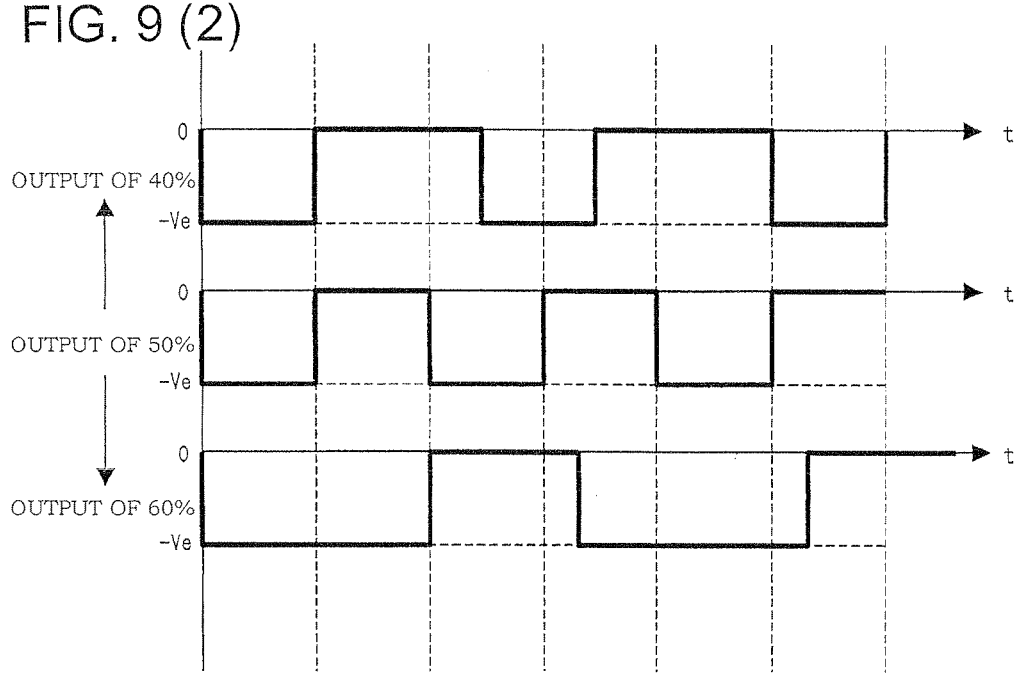

ELECTRON EMITTING DEVICE AND DRIVING METHOD THEREOF

CROSS-REFERENCE TO RELATED APPLICATION

This application is related to Japanese patent application No. 2010-259187 filed on Nov. 19, 2010 whose priority is claimed under 35 USC §119, the disclosure of which is incorporated by reference in its entirety.

BACKGROUND OF THE INVENTION

1. Field of the Invention

The present invention relates to an electron emitting device and a driving method thereof.

2. Description of the Related Art

As mechanisms which emit electrons from an interior of a solid to an outside, a thermoelectronic emission, a photoelectron emission, a field electron emission, a secondary electron emission, and the like have been typically known.

Electron emitting devices having a field electron emission mechanism in these mechanisms, that is, an MIM (metal insulator metal) electron emitting device and an MIS (metal insulator semiconductor) electron emitting device have been known. These electron emitting devices are electron emitting devices of the surface-emitting type each of which uses a quantum size effect and an intense electric field in an interior of the electron emitting device to accelerate electrons and emits the electrons from its plate-shaped device surface. Since the electrons accelerated in electron acceleration layers in the interior of the devices are emitted to an outside, these electron emitting devices do not require an intense electric field outside the devices.

On the contrary, in a Spindt type electron emitting device and a CNT type electron emitting device, which use an intense electric field outside the devices, the device itself is likely to be broken down due to a sputtering with an ionization of gaseous molecules, so that a handling in low vacuum is troublesome. Therefore, attention has been given to the MIM electron emitting device and the MIS electron emitting device, which can emit electrons, not only in low pressure, but also in atmospheric pressures, thereby advancing their technical development.

For example, it has been reported that an electron source called a ballistic electron surface-emitting device (BSD) has an excellent characteristic in low vacuum (see J. Vac. Sci. Technol. B 23 2336-2339 (2005). "Operation of nanocrystalline silicon ballistic emitter in low vacuum and atmospheric pressures.").

In addition, an electron emitting device which improves a stability in atmospheric pressures as compared with the conventional MIM electron emitting device and the MIS electron emitting device has been developed. For example, an electron emitting device has been known in which an electron acceleration layer including conductive particles which are configured of electric conductors and have a strong anti-oxidant action and insulating substances larger than the conductive particles is provided between a substrate having a lower electrode and an upper electrode configured of a conductor thin film. It has been known that the electron emitting device can stably emit electrons in atmospheric pressures (see, Japanese Unexamined Patent Publication No. 2009-146891).

In the ballistic electron surface-emitting device, nanometer order silicon microcrystals and a silicon oxide film covering the microcrystals continuously and alternately provide an electron transit space which is not subjected to an electron scattering and an electron acceleration field of a local intense electric field, thereby emitting electrons.

However, when the electron source is driven in atmospheric pressures, in particular, in a room atmosphere including oxygen and water vapor, the silicon microcrystals combine with the oxygen in the atmosphere, with the result that the entire microcrystals are modified to an oxidized silicon. Therefore, the structure itself which generates ballistic electrons is lost.

Therefore, it is difficult to drive the electron source for a long period of time of several hours or several hundred hours in atmospheric pressures, in particular, in a room atmosphere including oxygen, so that a device which can be driven for a long period of time in the atmosphere has been desired.

On the other hand, the electron emitting device in which the electron acceleration layer includes conductive particles and insulating substances is configured of a material which is hard to be oxidized as compared with the ballistic electron surface-emitting device, thereby having an excellent characteristic in atmospheric pressures (room atmosphere).

However, in such a electron emitting device, since the electron acceleration layer includes the insulating substances as a main component, electrons are likely to be captured into the electron acceleration layer (an electron charging is likely to occur). When the electrons are captured, the captured electrons cause a local release of an acceleration electric field in the electron acceleration layer to make an acceleration of the electrons insufficient, thereby deteriorating an electron emission of the electron emitting device. The electron capture occurs continuously when an acceleration voltage is applied, with the result that when a direct current voltage is applied continuously, an electron emission amount is lowered with an elapse of voltage application time (driving time) although the device is not physically broken down. Such a lowered electron emission amount can be coped with by increasing the acceleration voltage, but when the electron capture occurs again, the electron emission amount is lowered eventually (therefore, even when the acceleration voltage is increased until the electron acceleration layer is electrically broken down, a stable electron emission amount cannot be maintained).

In this way, it is difficult for the electron emitting device to stably emit electrons for a long period of time in atmospheric pressures, in particular, in a room atmosphere including oxygen, so that a device which can stably emit electrons for a long period of time in an atmosphere has been desired.

In the electron emitting device, when a direct current voltage is applied continuously in atmospheric pressures (in particular, in a room atmosphere including water vapor), an electromigration of a substrate metal can occur to physically break the electron acceleration layer down. Therefore, a device which can be driven for a long period of time in an atmosphere has been desired.

SUMMARY OF THE INVENTION

The present invention has been made in view of such circumstances and provides a device which can stably emit electrons over a long period of time in an atmosphere and a driving method thereof. In addition, the present invention provides a device which can be driven for a long period of time in an atmosphere and a driving method thereof.

The present invention provides a driving method of an electron emitting device which includes a first electrode, a particle layer formed on the first electrode and including insulating particles, and a second electrode formed on the particle layer, and applies a voltage between the first electrode and the second electrode to accelerate electrons emitted from the first electrode in the particle layer and emit the electrons via the second electrode, wherein pulses at a first frequency are oscillated at a second frequency lower than the first frequency and are applied between the first electrode and the second electrode.

The present inventors have conducted an experiment and have found, in an electron emitting device which includes a first electrode, a particle layer formed on the first electrode and including insulating particles, and a second electrode formed on the particle layer, and applies a voltage to between the first electrode and the second electrode to accelerate electrons emitted from the first electrode in the particle layer and emit the electrons via the second electrode, that a lowered electron emission amount when an alternating current voltage is applied continuously to between the first electrode and the second electrode is smaller than a lowered electron emission amount when a direct current voltage is applied, and that when the alternating current voltage has a high frequency, the lowered electron emission amount is particularly small.

Further, the present inventors have considered that a difference between the direct current voltage and the alternating current voltage is in the time required for a charging of an electron acceleration layer (a layer which accelerates electrons, and corresponds to the particle layer in the present invention), in other words, only in a magnitude of a charging time constant, with the result that in the driving method at either of the voltages, an electron acceleration electric field is released by a local intense electric field formed by captured electrons, thereby reducing an electron emission amount.

Accordingly, the present inventors have considered that the electrons captured in the electron acceleration layer are required to be removed in order to obtain a stable electron emission amount over a long period of time, and have conducted a further experiment. As a result, the present inventors have found that when time in which an electric field accelerating electrons is not applied to the electron acceleration layer is provided, that is, when the pulses at the first frequency are applied to between the first electrode and the second electrode at the second frequency lower than the first frequency, the electrons captured in the electron acceleration layer can be removed (that is, can be allowed to disappear), and have completed the present invention.

According to the present invention, the driving method of the device which can stably emit electrons over a long period of time in an atmosphere is provided.

BRIEF DESCRIPTION OF THE DRAWINGS

FIGS. 9(1) and 9(2) are waveform charts of assistance in explaining a pulse wave number map of a pulse density control used when the electron emitting device according to the embodiment of the present invention is subjected to an aging test (100-hour continuous operation) and a control method thereof.

DETAILED DESCRIPTION OF THE PREFERRED EMBODIMENT

Figure 1:
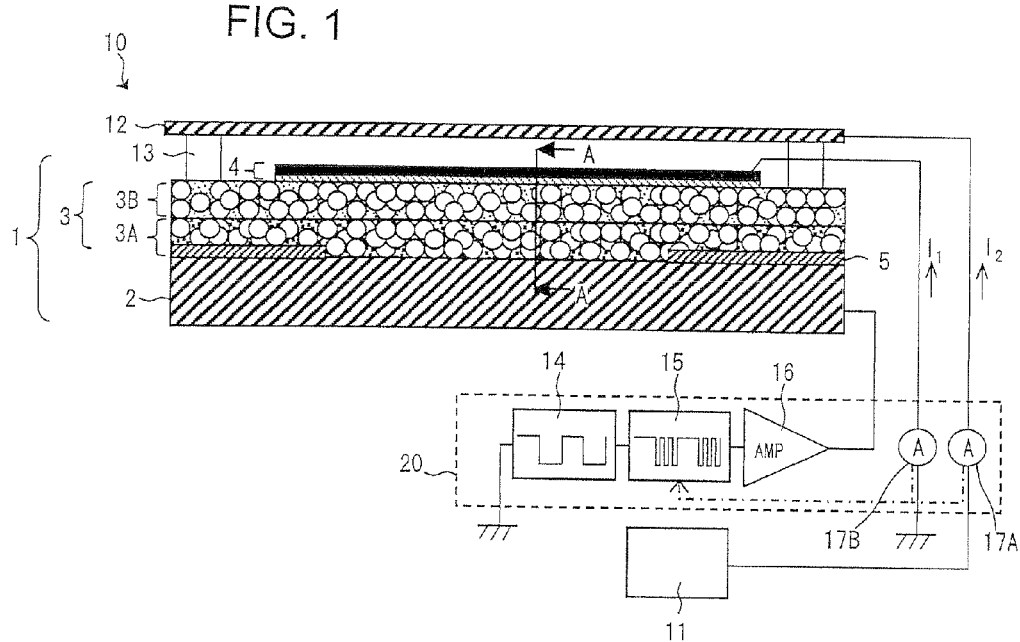
FIG. 1 is a concept diagram of assistance in explaining a structure of an electron emitting device according to an embodiment of the present invention.

A driving method of an electron emitting device of the present invention which includes a first electrode, a particle layer formed on the first electrode and including insulating particles, and a second electrode formed on the particle layer, and applies a voltage to between the first electrode and the second electrode to accelerate electrons emitted from the first electrode in the particle layer and emit the electrons via the second electrode, wherein pulses at a first frequency are oscillated at a second frequency lower than the first frequency and are applied to between the first electrode and the second electrode.

In the electron emitting device driving method of the present invention, since the pulses at the first frequency are used for the driving, an electric field is not applied to an electron acceleration layer during a period in which the pulses do not appear. Therefore, electrons which are temporarily captured into the electron acceleration layer are removed (or are allowed to disappear) from an interior of the electron acceleration layer within the period, and since a local electric field release does not occur in the electron acceleration layer even when the voltage is applied by the pulses, the electrons are accelerated stably by the voltage of the pulses, so that an electron emission amount of the electron emitting device is hard to be reduced. Therefore, according to the driving method, the electron emitting device can stably emit electrons.

Further, since the pulses at the first frequency are used for the driving and a direct current voltage is not used, an electromigration of the first electrode (e.g., in a certain mode, a substrate made of a metal material), which occurs when the electron emitting device emits electrons, is hard to occur, so that the electron acceleration layer is hard to be physically broken down. Therefore, the electron emitting device can be driven for a long period of time even in an atmosphere.

Moreover, since the pulses used in the electron emitting device driving method of the present invention are at the first frequency higher than the second frequency, a voltage including an alternating current component is applied to the electron acceleration layer of the electron emitting device of the present invention.

When an alternating current frequency of the applied voltage including the alternating current component is increased, an electric current flowing to the electron acceleration layer exerts a so-called conductor skin effect in which the electric current concentrates on surfaces of the insulating particles configuring the electron acceleration layer (the particle layer in the present invention).

Here, it is assumed that in the electron emitting device to be driven in the present invention, part of the electric current flowing to the electron acceleration layer configured of the insulating particles (that is, electrons) is allowed to have a high energy by the voltage applied to the electron acceleration layer so as to serve as ballistic electrons which are desorbed from a solid surface (the second electrode formed on the particle layer in the present invention), thereby emitting electrons. According to the electron emitting device driving method of the present invention, since the electric current concentrates on the surfaces of the insulating particles, the ballistic electrons are easily desorbed from the solid surface, so that an electron emission can be easily maintained.

On the other hand, when such a conductor skin effect is caused: (1) A Joule heat is generated on the surfaces of the insulating particles, with the result that a lattice vibration is increased to scatter the ballistic electrons, whereby the electron emission by the electron emitting device may be inhibited (the electron emission amount may be reduced).

Further, as described above, (2) Even when the electron emitting device is driven by the alternating current voltage (that is, even when the voltage including the alternating current component is applied to the electron acceleration layer), electrons are captured into the electron acceleration layer (electron charging), whereby the electron emission amount may be reduced.

(3) When the frequency of the alternating current voltage is lowered, time in which an voltage application to the electron acceleration layer is performed continuously becomes longer, and as in a driving by a direct current voltage, an electromigration of the first electrode (for example, in a certain mode, a substrate made of a metal material) may occur.

From these viewpoints, the present inventors have conducted another experiment. As a result, from the viewpoints (1) and (2), the present inventors have found that unless the voltage is not applied to the electron acceleration layer for at least about 100 milliseconds, electrons captured into the electron acceleration layer can be removed, that is, an alternating current voltage at a frequency of about 10 Hz or less is applied to the electron acceleration layer (for example, a voltage of a waveform including pulses at a frequency of 0.008 Hz, 0.05 Hz, 0.1 Hz, or 0.2 Hz is applied to between the first electrode and the second electrode), so that electrons are hard to be captured into the electron acceleration layer. Further, from the viewpoint (3), the present inventors have found that an alternating current voltage of several hundred Hz or more is applied to the electron acceleration layer (for example, a frequency of pulses is 100 Hz or more, and a voltage of a waveform of the pulses is applied to between the first electrode and the second electrode), so that the electromigration is hard to occur.

The present inventors have also found that even when a voltage of a waveform including pulses at frequencies of 50 Hz to 10 kHz is applied to between the first electrode and the second electrode, the electron emission amount is not reduced.

According to these results, in the present invention, preferably, the first frequency is 100 Hz to 10 kHz and the second frequency is 0.008 Hz to 2 Hz.

Here, each of the pulses is preferably configured of a rectangular wave. The rectangular wave is also called a square wave, and has duty ratios of e.g., 25% and 50%. The electron emitting device driving method of the present invention uses a plurality of pulses (that is, two or more rectangular waves). When an electron emission amount is constant, the pulses have substantially the same amplitude.

Hereinafter, an embodiment of the present invention will be described.

In the embodiment of the present invention, in addition to a structure of the invention described above, an electric current between the first electrode and the second electrode may be measured to modulate the pulses based on the measured electric current value. For example, when the electric current between the first electrode and the second electrode is measured and the measured electric current value is then increased or decreased, the pulses may be modulated so as to make an electron emission amount constant. Here, the pulses may be modulated to make the electron emission amount substantially constant, so that its degree may be determined in consideration of driving time (e.g., life) of the electron emitting device.

According to this embodiment, since the electric current between the first electrode and the second electrode is measured, an electron emission amount of the electron emitting device can be measured indirectly. The measured electric current value is increased or decreased to modulate the pulses, so that a variation in the electron emission amount can be adjusted by the pulse modulation. Therefore, there is provided the driving method of the electron emitting device which can stably emit electrons, with an increase or decrease of the electron emission amount being less.

Here, in the electron emitting device to be driven in the present invention, a correlation between a variation in a driving environment of the electron emitting device and an electric current flowing in the device is high, and a correlation between an electric current flowing in the device and an amount of electrons emitted from the device is also high. Thus, according to this embodiment, there is provided the driving method of the electron emitting device which can stably emit electrons without depending on an environmental change in temperature and humidity. Therefore, the device which can stably emit electrons over a long period of time in an atmosphere and the driving method thereof are provided.

Further, a measurement of the electric current between the first electrode and the second electrode may be applied to an electron emitting device including a different electrode. For example, the electron emitting device may further include a third electrode arranged opposite the second electrode, wherein an amount of electrons emitted to the third electrode may be measured to modulate the pulses according to the measured electric current value. In this mode, the driving method of the electron emitting device which can stably emit electrons, with an increase or decrease of the electron emission amount being less, is provided.

Furthermore, in the embodiment of the present invention, in addition to the structure of the invention described above, the modulation of the pulses may be a pulse density modulation or a pulse width modulation. In this case, the pulse density modulation generates a waveform by a density of pulses having a constant width, and the pulse width modulation generates a waveform by a variable pulse width.

According to the embodiment, the modulation of the pulses is performed by the pulse density modulation or the pulse width modulation according to the measured electric current value, so that the driving method of the electron emitting device which can stably emit electrons, with an increase or decrease of the electron emission amount being less, is provided.

According to another viewpoint, the present invention provides an electron emitting device which includes a first electrode, a particle layer formed on the first electrode and including insulating particles, a second electrode formed on the particle layer, and a driving section which applies a voltage to between the first electrode and the second electrode to accelerate electrons emitted from the first electrode in the particle layer and emit the electrons via the second electrode, wherein the driving section oscillates pulses at a first frequency at a second frequency lower than the first frequency, and a waveform generating circuit is connected to the first electrode and the second electrode.

According to the electron emitting device of the present invention, the driving section adopts the electron emitting device driving method described above. Therefore, the device which can stably emit electrons over a long period of time in an atmosphere is provided.

Further, in the embodiment of the electron emitting device of the present invention, the driving section may be a driving section in which the first frequency is 100 Hz to 10 kHz, the second frequency is 0.008 Hz to 2 Hz, and the pulses are configured of rectangular waves. That is, the driving section preferably oscillates the pulses in which the first frequency is 100 Hz to 10 kHz and the second frequency is 0.008 Hz to 2 Hz. Moreover, in the driving section, preferably, the pulses are configured of rectangular waves. For example, the driving section may be the waveform generating circuit which oscillates the pulses at the first frequency at the second frequency lower than the first frequency, and the waveform generating circuit may be connected to the first electrode and the second electrode. In this case, for example, a pattern generator and a signal generator correspond to the waveform generating circuit. The driving section may include an electric current measuring section which measures an electric current between the first electrode and the second electrode, and a pulse modulating section which modulates the pulses based on the measured electric current value. For example, the driving section may include an electric current measuring section which measures an electric current between the first electrode and the second electrode, and a pulse modulating section which modulates the pulses to make an electron emission amount constant when the measured electric current value is increased or decreased. In this case, the pulse modulating section may modulate the pulses to make an electron emission amount substantially constant, and its degree may be determined in consideration of the driving time (e.g., life) of the electron emitting device. The pulse modulating section may be a modulating section which modulates the pulses by a pulse density modulation or a pulse width modulation.

Further, although the electron emitting device of the present invention adopts the structure which includes a first electrode, a particle layer formed on the first electrode and including insulating particles, and a second electrode formed on the particle layer, wherein a voltage is applied to between the first electrode and the second electrode to accelerate electrons emitted from the first electrode in the particle layer and emit the electrons via the second electrode, for example, the following mode may be adopted.

Specifically, an electron emitting device according to another embodiment of the present invention may further include an insulating layer formed on the first electrode and having an opening, wherein the second electrode may be formed on the insulating layer and be arranged so as to be opposite the first electrode across the opening and to overlap partially with the insulating layer, and the particle layer may be arranged between the first and second electrodes and the insulating layer and be configured of insulating particles and conductive particles. In this mode, the insulating layer may be formed so as to be contacted with the first electrode, the particle layer may be arranged between the second electrode and the insulating layer as well as in the opening, and the insulating layer may be made of a silicone resin.

In a further embodiment, the second electrode may have a surface formed with a recess portion, the second electrode may include a first electrode layer formed close to the particle layer and a second electrode layer formed on the first electrode layer and having a resistance value higher than that of the first electrode layer, the first electrode layer having a surface formed with a recess portion, and the second electrode layer may be electrically connected to the particle layer by passing the recess portion through the first electrode layer.

In a still further embodiment, the respective structures may be configured of the following materials. For example, the first electrode layer may be an amorphous carbon layer, and the second electrode layer may be a metal layer. The second electrode layer may be configured of a material including at least one of gold, silver, tungsten, titanium, aluminum, and palladium. Alternatively, the particle layer may further include an insulating particle layer configured of insulating particles, and the insulating particles and conductive particles configuring the particle layer may be fixed by a silicone resin. Further alternatively, the conductive particles may be configured of a material including at least one of gold, silver, platinum, palladium, and nickel, and may have an average particle diameter of 3 to 10 nm, and the insulating particles may be configured of a material including at least one of $SiO_2$, $Al_2O_3$, and $TiO_2$, and may have an average particle diameter of 10 to 1000 nm.

Hereinafter, an embodiment and an example of the present invention will be specifically described with reference to the drawings. The embodiment and the example to be described below are only specifically exemplified in the present invention, and the present invention may not be understood by being limited thereto.

Embodiment

FIG. 1 is a concept diagram of assistance in explaining a structure of an electron emitting device 1 according to an embodiment of the present invention.

As shown in FIG. 1, the electron emitting device 1 according to this embodiment includes an electrode substrate 2, a particle layer 3 (also called an electron acceleration layer) formed on the electrode substrate 2, a thin film electrode 4 formed on the particle layer 3, and a driving section 20 which applies a voltage to between the electrode substrate 2 and the thin film electrode 4 to drive the device.

In this embodiment, in order that a non-uniform electric field does not occur in the particle layer 3 when the voltage is applied to between the electrode substrate 2 and the thin film electrode 4, an insulator thin film 5 having an opening is provided, and further, the thin film electrode 4 is formed of plural conductive films so as to emit uniform and sufficient electrons from the entire thin film electrode 4.

These structures are not always necessary in principle in this embodiment. However, in a case where such structures are adopted, an electric field does not concentrate on part of the particle layer 3 even when the electron emitting device 1 is driven for a long period of time, so that the electron emitting device 1 can be driven continuously for a long period of time. Thus, the electron emitting device 1 which adopts these structures will be described below.

(Electrode Substrate)

The electrode substrate 2 is formed of aluminum. The electrode substrate 2 is a lower electrode (an electrode arranged below in FIG. 1), and has a function as a substrate. That is, the electrode substrate 2 may be a structural body (e.g., a plate-shaped body) having a conductivity, and be a structural body which supports the electron emitting device. Therefore, as the electrode substrate 2, a substrate which has a strength to some extent and a moderate conductivity is used. As the electrode substrate 2, for example, an SUS, a metal substrate made of Al, Ti, Cu, or the like, and a semiconductor substrate made of Si, Ge, GaAs, or the like can be exemplified. Alternatively, an insulator substrate which has a surface provided with an electrode formed of a conductive material may be used (that is, a structural body in which a surface of a plate-shaped body including an insulating material is coated with a conductive material may be used). As such a substrate, for example, a glass substrate and a plastic substrate, each of which has a surface formed with a metal film, can be exemplified.

As the conductive material used for forming such an electrode, a material which is excellent in conductivity and can form a thin film using a magnetron sputtering is selected. To stably operate the electron emitting device in an atmosphere, a conductive material having a high anti-oxidant ability may be used. Preferably, a noble metal is used. ITO which is an oxide conductive material and is widely used in a transparent electrode is also useful. Ti and Cu which can form a strong thin film may also be used. For example, a metal thin film in which Ti of 200 nm is formed on a glass plate surface and Cu of 1000 nm is formed thereon may also be used.

As the electrode substrate 2 on which the particle layer to be described later is stacked, a substrate which has a good adhesiveness to a layer (member) directly contacted with the electrode substrate 2 may be selected.

(Insulator Thin Film)

The insulator thin film 5 is formed of a silicone resin, is formed on the electrode substrate 2, and has an opening. The insulator thin film 5 may be formed of any material which functions as an insulator with respect to a driving voltage which drives the electron emitting device, but in order for the insulator thin film 5 to have the opening, a material which enables patterning, that is, can control a shape, is required to be used.

Therefore, as the material for the insulator thin film 5, an ultraviolet curing and thermosetting silicone resin is suitable. As the silicone resin, for example, the SR 2411 silicone resin of a room temperature and humidity curing type, which is manufactured by Dow Corning Toray Silicone Co., Ltd., is used.

When the insulator thin film 5 is formed of the silicone resin, the opening may be patterned by the following process. First, the silicone resin is applied onto the electrode substrate 2 to prebake the electrode substrate 2 to which the silicone resin is applied. Then, a mask pattern (a mask including a pattern of the electrode having the opening) is overlapped for irradiation with an ultraviolet ray for a predetermined period of time. Thereby, the silicone resin film is pattern transferred with different film curing degrees. A portion irradiated with the ultraviolet ray becomes a hard film as compared with a portion not irradiated therewith, so that the silicone resin film in the portion which is not irradiated with the ultraviolet ray can be removed selectively by wiping the silicone resin film having been irradiated with the ultraviolet ray with a soft waste. As described above, the insulator thin film 5 having the opening can be formed of the silicone resin.

As another material for the insulator thin film 5, an oxidized silicon can be exemplified. With the oxidized silicon, the insulator thin film 5 having the opening can be formed by using e.g., a typical CVD (chemical vapor deposition) apparatus or a sputtering apparatus which can form a silicon oxide film and various ion etching processes. In this way, in place of the silicone resin, the oxide silicon which is an inorganic material may be used.

The insulator thin film 5 is formed to have a film thickness of 500 to 1000 nm. In this range, no steps which inhibit the particle layer 3 from being formed are generated and insulating properties can be secured.

(Thin Film Electrode)

Figure 2:
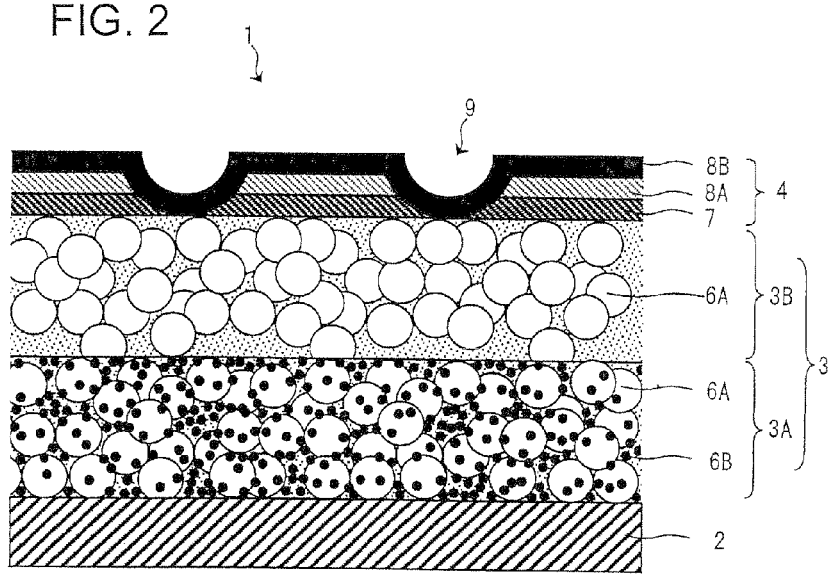
FIG. 2 is a cross-sectional view taken along line A-A in FIG. 1.

The thin film electrode 4 is formed of a plurality of conductive films so that uniform and sufficient electrons are emitted from the entire thin film electrode 4. FIG. 2 shows a cross-sectional view of assistance in explaining a structure of the thin film electrode 4 and the particle layer 3. FIG. 2 is a cross-sectional view taken along line A-A in FIG. 1.

As shown in FIG. 2, the thin film electrode 4 includes an amorphous carbon layer 7, a porous electrode layer 8A, and a non-porous electrode layer 8B, and the amorphous carbon layer 7, the porous electrode layer 8A, and the non-porous electrode layer 8B are stacked in this order on the particle layer 3. The thin film electrode 4 has a surface formed with holes 9 (recess portions).

The amorphous carbon layer 7 is formed so that clusters of a graphite structure having a so-called $SP^2$ hybrid orbital (clusters of about several hundred atoms) are stacked at random. Although graphite itself is a material excellent in electric conductivity, the amorphous carbon layer 7, which is stacked with the electric conductivity between the clusters being poor, functions as a resistance layer. That is, the amorphous carbon layer 7 has an electric resistance higher than those of the porous electrode layer 8A and the non-porous electrode layer 8B.

Further, the amorphous carbon layer 7 is formed to have a layer thickness of about 10 nm. In order that the amorphous carbon layer 7 functions as the resistance layer, the amorphous carbon layer 7 is formed to have a film thickness of 5 nm or more.

The porous electrode layer 8A is formed of a material having gold and palladium as main components. The material for the porous electrode layer 8A may enable a voltage application, and the porous electrode layer 8A is formed of e.g., a metal. However, from the viewpoint of an electrode function which passes and emits electrons accelerated in the particle layer 3 (electron acceleration layer) to have a high energy without any energy loss to a possible extent, the material for the porous electrode layer 8A may have a low work function and be capable of forming a thin film. It can be expected that such a material emits more electrons from the formed device. As such a material, for example, gold, silver, tungsten, titanium, aluminum, palladium, or the like, which has a work function corresponding to 4 to 5 eV, can be exemplified. Among these, gold without oxide and sulfide formation reactions is the best material when an operation of the device in an atmosphere is assumed. Silver, palladium, tungsten, or the like with a relatively less oxide formation reaction is also a material which can withstand an actual use without any problems.

The porous electrode layer 8A has a surface formed with the holes 9. The holes 9 are uniformly distributed in the entire porous electrode layer 8A. Typically, a current path formed in the particle layer 3 is likely to be generated due to an electric field concentration. Therefore, when the holes 9 are provided in the electrode on the particle layer 3, a current path is likely to be formed in the particle layer 3. On the other hand, when the electric field concentration is limited, the number of abnormal current paths is increased, which causes an electric short-circuited state. On the contrary, when the electric field concentration is distributed uniformly and widely, the number of electron emission points of the device is increased, so that an electron emission amount is increased. Accordingly, when the holes 9 are distributed uniformly in the entire porous electrode layer 8A, a current path is likely to be formed in the particle layer 3 and the electron emission amount of the device is increased. Therefore, the holes 9 may be formed to have a small particle diameter (area), and a large number of the holes 9 may be arranged. The holes 9 may be arranged so as to be distributed uniformly in the entire porous electrode layer 8A.

Specifically, the particle diameter of the holes 9 is preferably 1 to 5 μm, and the holes 9 are preferably arranged in the porous electrode layer 8A at a density of 800 to 1200 pieces/mm$^2$. When the particle diameter is 1 μm or more, an electric field concentrates into the recess portions to be likely to form a current path, and when the particle diameter is 5 μm or less, an excessive electric field is hard to concentrate into the recess portions. Therefore, an abnormal current path formation is hard to occur. When the recess portions are distributed at a density of 800 pieces/mm$^2$ or more, current paths are not sparse, so that sufficient electrons can be emitted from the entire surface, and when the recess portions are distributed at a density of 1200 pieces/mm$^2$ or less, a conductivity in a surface of the second electrode can be kept uniform. Therefore, an electric current is easily supplied to the entire surface.

The holes 9 are formed so as to pass through the amorphous carbon layer 7 and the porous electrode layer 8A, and are coated with the non-porous electrode layer 8B. The particle layer 3 and the non-porous electrode layer 8B are contacted with each other at the holes 9. By noting a structure from the particle layer 3 to the non-porous electrode layer 8B, the holes 9 and portions other than the holes 9 have different electric resistances, and the holes 9 have a relatively low electric resistance, so that a current path is formed concentratively into the holes 9, thereby enabling electrons to be emitted from the recess portions more concentratively.

Such holes 9 can be formed by scattering particle substances onto the particle layer 3, stacking a layer made of amorphous carbon and a metal layer made of gold and palladium on the particle layer 3 on which the particle substances are scattered, and then removing the scattered particle substances. Therefore, a shape of the holes 9 depends on a shape of the particle substances scattered in the above process. That is, in a thin film forming method using a sputtering method or a depositing method, which is used for manufacturing the thin film electrode 4 to be described later, there is formed a thin film which is routed to shadows of the scattered particle substances. From this fact, a size of the particle substances, which is larger than the particle diameter of the holes 9 by about several ten percent, may be selected. Further, as the particle substances, silica particles are suitably used.

As in the porous electrode layer 8A, the non-porous electrode layer 8B is formed of a metal layer that is formed of materials including gold and palladium as main components. Like the material for the porous electrode layer 8A, the material for the non-porous electrode layer 8B may enable a voltage application. Therefore, as described above, the non-porous electrode layer 8B may be formed of a material same as that for the porous electrode layer 8A.

Further, the non-porous electrode layer 8B covers the porous electrode layer 8A. That is, the non-porous electrode layer 8B is formed so as to coat a surface of the porous electrode layer 8A, and the holes 9 are also coated with the non-porous electrode layer 8B. In order that the thin film electrode 4 functions as an electrode, the metal layer including the porous electrode layer 8A and the non-porous electrode layer 8B is required to function as an electrode. Therefore, a layer thickness of layers of the porous electrode layer 8A and the non-porous electrode layer 8B (metal layers) (a total value of a layer thickness of the porous electrode layer 8A and a layer thickness of the non-porous electrode layer 8B) may be 10 nm or more. When the total layer thickness is 10 nm or more, a sufficient conductivity can be secured as an electrode. In this embodiment, the non-porous electrode layer 8B is formed to have a film thickness of 20 nm.

A film thickness of the thin film electrode 4 is important in order to efficiently emit electrons from the electron emitting device 1 to an outside, and its maximum film thickness portion is preferably in a range of 15 to 100 nm. In this way, the thin film electrode 4 is required to be formed at a film thickness of 100 nm or less, and the thin film electrode 4 which has a film thickness exceeding this range extremely reduces a ballistic electron emission. It is considered that the number of the ballistic electrons to be emitted is reduced because the thin film electrode 4 absorbs or reflects the ballistic electrons and the electrons are captured into the particle layer 3 again.

Since the thin film electrode 4 may function as an electrode, the thin film electrode 4 may be formed of a single conductive film, like, for example, the metal film including gold and palladium. Alternatively, as in this embodiment, the thin film electrode 4 may be formed of a plurality of conductive films (a so-called stack structure).

(Particle Layer)

The particle layer 3 is arranged between the electrode substrate 2 and the thin film electrode 4, and substantially includes insulating particles 6A. Specifically, as shown in FIG. 2, the particle layer 3 includes a first particle layer 3A formed on the electrode substrate 2, and a second particle layer 3B formed on the first particle layer 3A.

The first particle layer 3A includes the insulating particles 6A and conductive particles 6B, and the insulating particles 6A and the conductive particles 6B mainly include nano-size particles.

The insulating particles 6A are formed of silica ($SiO_2$). The material for the insulating particles 6A is required to have insulating properties, and the insulating particles 6A may include a material selected from $Al_2O_3$ and $TiO_2$ in addition to the $SiO_2$ as main components. More specifically, for example, the fumed silica C413 manufactured by Cabot Corporation can be used. A material having high insulating properties like $SiO_2$, $Al_2O_3$, and $TiO_2$ can easily adjust a resistance value of the particle layer 3 to a desired value. Moreover, when these oxides are used, oxidation is hard to occur, so that the device can be prevented from being deteriorated.

The insulating particles 6A have an average particle diameter of 50 nm. The insulating particles 6A preferably have an average particle diameter of 10 to 1000 nm, and the average particle diameter is more preferably 10 to 200 nm. The insulating particles 6A may have a distributed state of the particle diameters which is broad with respect to the average particle diameter, and for example, the particles having an average particle diameter of 50 nm may have its particle diameter distribution in a range of 20 to 100 nm. Therefore, even in such a distributed state, the average particle diameter of the insulating particles may satisfy the above range of the average particle diameter. When the average particle diameter is too small, a force acting between the particles is strong, so that the particles are likely to be coagulated and are hard to be distributed. On the other hand, when the particle diameter of the insulating particles is too large, a distributiveness is good, but a void in the thin film particle layer becomes larger, so that a resistance of the particle layer is hard to be adjusted. Therefore, the range of the above average particle diameter is preferable.

The conductive particles 6B are formed of silver. The conductive particles 6B may be formed of a noble metal in order to prevent the electron emitting device from being oxidized and deteriorated in an atmosphere. For example, the conductive particles 6B may be formed of a metal material including gold, platinum, palladium, or nickel, in addition to silver mentioned above, as main components. Such conductive particles 6 can be manufactured by using a sputtering method or a spray heating method as a known particle manufacturing technique, and commercially available metal particles such as silver nanoparticles manufactured and sold by Applied Nanotechnology Research Institute can also be used.

The conductive particles 6B are nanoparticles having an average particle diameter of 10 nm. As the conductive particles 6B control a conductivity of the first particle layer 3A, particles having an average particle diameter smaller than the average particle diameter of the insulating particles 6A are required to be used. Therefore, the average particle diameter of the conductive particles 6B is preferably 3 to 20 nm. The average particle diameter of the conductive particles 6B is made smaller than the average particle diameter of the insulating particles 6A, so that no conductive paths by the conductive particles 6B are formed in the electron acceleration layer 3, and an electric breakdown in the electron acceleration layer 3 is hard to occur. Further, there are many unclear points in principle, but the conductive particles 6B having the average particle diameter in the above range are used to efficiently generate ballistic electrons.

In the first particle layer 3A, the insulating particles 6A and the conductive particles 6B are fixed by a silicone resin. Therefore, even when the holes 9 are formed in the porous electrode layer 8A, the device is formed so as to have a sufficient mechanical strength. Moreover, since the silicone resin has a water-repellent function, water molecules are hard to adhere onto the particle layer 3, and even when the device is operated in an atmosphere, a change in an electric resistance due to the water molecules is hard to occur. Therefore, the electron emitting device can be formed so as to be operated stably. As the silicone resin, for example, the SR2411 silicone resin of a room temperature and humidity curing type, which is manufactured by Dow Corning Toray Silicone Co., Ltd., is used.

The second particle layer 3B includes the insulating particles 6A. As the insulating particles 6A, the particles same as the insulating particles 6A used in the first particle layer 3A are used. In this way, as the insulating particles 6A used in the second particle layer 3B, the particles same as those of the first particle layer 3A may be used.

In the second particle layer 3B, the insulating particles 6A and the insulating particles 6A are fixed by a silicone resin. The silicone resin is the same as that of the first particle layer 3A. Therefore, effects of a mechanical strength and a water molecule adherence, which are similar to the above-described effects, can be obtained also in the second particle layer 3B.

In this embodiment, the silicone resin is used in the first particle layer 3A and the second particle layer 3B to fix the particles with each other, but the silicone resin may be used only in either one of these layers. In this case, the effects on the mechanical strength and the water molecule adherence can be obtained in the layer using the silicone resin.

The particle layer 3 is formed to have a layer thickness of 1200 nm, the first particle layer 3A is formed to have a layer thickness of 700 to 800 nm, and the second particle layer 3B is formed to have a layer thickness of 400 to 500 nm. In order that the particle layer 3 can have a uniform layer thickness and a uniform resistance in a layer thickness direction, the particle layer 3 may have a layer thickness of 300 to 4000 nm. The particle layer 3, which functions as the electron acceleration layer, may include only the first particle layer 3A, so that the particle layer 3 may be managed by a total layer thickness of the first particle layer 3A and the second particle layer 3B.

The particle layer 3 may include only the first particle layer 3A, but as in this embodiment, the particle layer 3 may include the first particle layer 3A and the second particle layer 3B. More specifically, when an unevenness on a surface of the particle layer 3 is too large as compared with the layer thickness of the particle layer 3, an electric field abnormality caused by the surface shape occurs to cause an electric current concentration. In addition, with an energization to the device for a long period of time, an accidental electric current concentration point is provided in the particle layer 3. In order to avoid these problems, the particle layer 3 may include the first particle layer 3A and the second particle layer 3B to release the unevenness on the surface of the particle layer 3. The layer thickness of the particle layer 3 is preferably smaller, but may be slightly increased, which is useful for solving the above problems.

The particle layer 3 is formed on the insulator thin film 5, and is arranged between the insulator thin film 5 and the thin film electrode 4. The particle layer 3 is arranged between the substrate electrode 2 and the insulator thin film in the opening of the insulator thin film 5. The particles of the particle layer 3 (the insulating particles 6A and the conductive particles 6B) bury the opening of the insulator thin film 5.

With such an arrangement, the insulator thin film 5 releases an electric field concentration formed on the particle layer 3 by an end of the thin film electrode 4 so as to inhibit an occurrence of an abnormal electric current concentration. That is, it is considered that a non-uniform electric field does not appear in the particle layer between the end of the second electrode and the first electrode in the following mechanism.

When the driving section 20 applies a voltage to between the electrode substrate 2 and the thin film electrode 4, a current path is formed in the particle layer 3 (electron acceleration layer), and some electric charges thereof turn into ballistic electrons by an intense electric field formed by the applied voltage so as to be emitted from the thin film electrode 4. There are still many unclear points at the present stage in a ballistic electron occurrence mechanism in the particle layer 3, but it is understood that electrons emitted from the surface of the device accelerate some electric charges conducting in a current path formed in the particle layer 3 by a high electric field portion which is locally formed in the particle layer 3 and become hot electrons (ballistic electrons) so as to jump out into a space. It is considered that the electrons emitted between the particle layers configuring the particle layer 3 advance along the electric field formed in the particle layer 3 while repeating ballistic collisions, and some of them pass through the thin film electrode on the surface or slip through a gap between the electrodes and exit from the surface of the device.

At this time, a portion having the insulator thin film 5 between the electrode substrate 2 and the particle layer 3 does not flow an electric current by an electric insulation function of the insulator thin film 5 even when the particle layer 3 is sandwiched between the electrode substrate 2 and the thin film electrode 4. Further, in a portion without the insulator thin film 5 between the electrode substrate 2 and the particle layer 3, a uniform electric field generated by a potential difference between both electrodes occurs in the particle layer 3, and an electric current flows into the particle layer 3 to emit part thereof as hot electrons into a space. On the other hand, a non-uniformly concentrative electric field is generated in the particle layer 3 sandwiched between the end of the thin film electrode 4 and the electrode substrate 2, but since the shape controlled insulator thin film 5 (dielectric thin film) is provided in a return path along an electric power line thereof, the insulator thin film 5 releases the electric field by its electric insulation function and does not flow an electric current. Therefore, a current path is not formed directly below the end of the thin film electrode 4 in which conventionally, a non-uniform electric field is formed in the particle layer 3 and an electric current is likely to be concentrated, so that the state is not changed even when long energization time elapses. Further, an electric current flowing to the electrode substrate 2 from a portion corresponding to an opening 5A in the thin film electrode 4 continuously flows without unevenly distributing to a specific portion even when the long energization time elapses, thereby maintaining the electron emission from the entire surface.

(Driving Section)

As described above, the driving section 20 applies a voltage to between the substrate electrode 2 and the thin film electrode 4, accelerates electrons supplied from the substrate electrode 2 in the particle layer 3, and emits the electrons from the thin film electrode 4.

Specifically, the driving section 20 includes a low frequency function generator 14, a high frequency function generator 15, and an electric power amplifier 16 which is connected to these function generators and amplifies signal waveforms generated by the function generators. The high frequency function generator 15 allows the waveform outputted from the low frequency function generator 14 to include the signal waveform generated by the high frequency function generator for outputting.

Further, in this embodiment, a collecting electrode 12 is arranged via an insulator spacer 13 over the thin film electrode 4 in order to measure an amount of electrons emitted from the electron emitting device 1. The collecting electrode 12 is connected to a collecting bias power source 11 which applies a direct current bias, and an electron emission ampere meter 17A for measuring an amount of electrons to be emitted is connected therebetween. Further, in order to measure an electric current flowing in the electron emitting device 1, an electron emission ampere meter 17B is connected to the thin film electrode 4, and the thin film electrode 4 is grounded via the electron emission ampere meter 17B. The low frequency function generator 14 and the high frequency function generator 15 are also grounded, so that the voltage is applied based on the ground.

Figure 3:
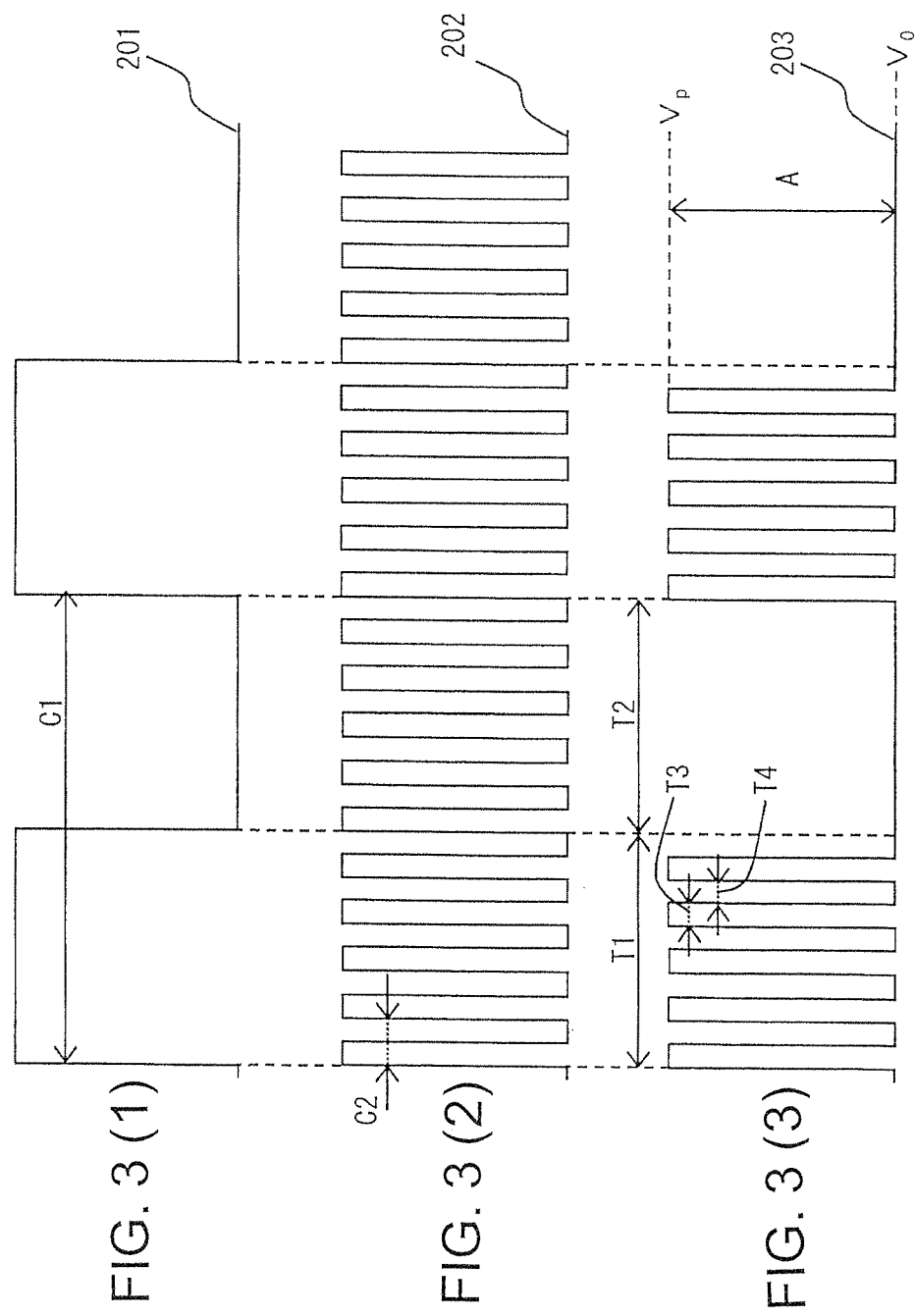
FIGS. 3(1), 3(2), and 3(3) are charts of assistance in explaining driving waveforms generated by a driving section of the electron emitting device according to the embodiment of the present invention.

The low frequency function generator 14 and the high frequency function generator 15 generate signals for driving the electron emitting device 1 (outputs of the driving section 20). Signal waveforms generated by these function generators and a signal waveform for driving the electron emitting device 1 (an output waveform of the driving section 20) are shown in FIGS. 3(1) to 3(3). FIGS. 3(1) to 3(3) are charts of assistance in explaining driving waveforms generated by the driving section of the electron emitting device according to the embodiment of the present invention. FIG. 3(1) shows a signal waveform generated by the low frequency function generator 14, and FIG. 3(2) shows a signal waveform generated by the high frequency function generator 15. Further, FIG. 3(3) shows a signal waveform for driving the electron emitting device 1, which is generated by these function generators.

As shown in FIGS. 3(1) to 3(3), the low frequency function generator 14 and the high frequency function generator 15 generate a low frequency signal 201 (cycle C1) and a high frequency signal 202 (cycle C2. C2>C1), respectively. These signals include rectangular waves (square waves) which appear in a fixed cycle, and are set such that a frequency (1/C2) of the high frequency signal 202 is higher than a frequency (1/C1) of the low frequency signal 201, and while one rectangular wave of the low frequency signal 201 rises (in a period T1 shown in FIG. 3(3)), a plurality of (an integer of 2 or more) rectangular waves of the high frequency signal 202 rise.

Specifically, the low frequency function generator 14 generates the low frequency signal 201 at a frequency of 0.008 Hz to 2 Hz, and the high frequency function generator 15 generates the high frequency signal 202 at a frequency of 100 Hz to 10 kHz. For example, as in this embodiment, the rectangular waves at these frequencies may be outputted from the plurality of function generators to configure the driving section 20, or the function generators 14 and 15 may include known signal generators such as pulse generators (e.g., pulse signal generators) to configure the driving section 20 such that the respective signal generators generate signals at these frequencies.

When the low frequency signal 201 is generated (outputted) by the low frequency function generator 14, the signal is inputted to the high frequency function generator 15 as shown in FIG. 1, a logic product (AND) of the signal and the high frequency signal 202 generated by the high frequency function generator 15 is obtained, and the logic product is outputted from the high frequency function generator 15 and is inputted to the electric power amplifier 16 (a waveform 203 of FIG. 3(3)). The electric power amplifier 16 amplifies the signal so as to have a magnitude necessary for driving the electron emitting device (the output signal of the high frequency function generator 15 is amplified so that an amplitude A shown in FIG. 3(3) becomes suitable for driving the electron emitting device). Thereby, the signal waveform shown in FIG. 3(3) is obtained and is applied to between the substrate electrode 2 and the thin film electrode 4 of the electron emitting device 1. In other words, the signal waveform in which high-frequency pulses (e.g., rectangular waves) appear at a fixed frequency is applied to between the substrate electrode 2 and the thin film electrode 4 of the electron emitting device 1.

As shown in FIG. 3(3), the signal waveform applied to between the substrate electrode 2 and the thin film electrode 4 includes on time in which the rectangular wave of the low frequency signal 201 rises (the period of T1 in FIG. 3(3)) and the rectangular wave of the high frequency signal 202 rises, and off time in which the rectangular wave of the low frequency signal 201 or the rectangular wave of the high frequency signal 202 does not rise. In the former time, the voltage is applied to between the substrate electrode 2 and the thin film electrode 4 to emit electrons from the electron emitting device 1, and in the latter time, the voltage application is stopped to stop the electron emission from the electron emitting device 1. When the voltage application continues in the former time, the electrons are captured into the particle layer 3 (an electron emission amount of the electron emitting device 1 is reduced), and in the latter time, the captured electrons are removed (or are allowed to disappear). A period of time in which the electrons are removed (or are allowed to disappear) tends to increase in proportion to a product value of the on time (e.g., a product of the time by the amplitude of the signal), and the off time is preferably several seconds or more from experiments of the example to be described later.

In this way, the on time and the off time are required to be adjusted in consideration of a balance between the reduction in the electron emission amount of the electron emitting device 1 occurring in the on time and the removal (disappearance) of the captured electrons occurring in the off time. Its specific value is increased or decreased according to a structure (electric characteristic) of the electron emitting device, but as described above, preferably, the frequency of the low frequency signal 201 of the driving section 20 is 0.008 Hz to 2 Hz, and the frequency of the high frequency signal 202 of the driving section 20 is 100 Hz to 10 kHz. With such frequencies, as is apparent from the example to be described later, the electron emission amount of the electron emitting device 1 can be stabilized for a long period of time in an atmosphere.

(Pulse Modulation)

The electron emission amount of the electron emitting device 1, which is driven in a room atmosphere (or in an atmosphere), can be varied by being affected by a change in the device itself with time and a change in temperature and humidity in the room atmosphere. With respect to such variation in the electron emission amount, the driving section 20 may perform a pulse modulation using the electron emission ampere meter 17A or the electron emission ampere meter 17B described above. In such a mode, an electron emission can be stably performed without depending on the environmental change in temperature, humidity, or the like. In this case, the driving section 20 may adjust the period in which the rectangular wave of the high frequency signal 202 in the above-described on time rises.

Specifically, as shown in FIG. 1, the driving section 20 includes the electron emission ampere meter 17A or the electron emission ampere meter 17B, and the electron emission ampere meter 17A or the electron emission ampere meter 17B is connected to the high frequency function generator 15 and performs a pulse modulation according to an electric current value (an output of the ampere meter) measured by the current meter. Each of the ampere meters is used to monitor a variation in an output of the electron emitting device 1.

For example, as the pulse modulation, a pulse density modulation is adopted. As shown in FIG. 3(3), when a period T3 in which the waveform rises (on) and a period T4 in which the waveform falls (off) configure the rectangular wave of the high frequency signal 202 in the on time, the period T3 is left as it is (or the pulse width is constant) to perform the pulse density modulation which adjusts a pulse density. When the on time is made longer, the period T4 is decreased to increase the pulse density, and when the on time is made shorter, the period T4 is increased to decrease the pulse density.

As the pulse modulation, a pulse duty control (pulse width modulation) may be adopted. In the case of the rectangular waves shown in FIG. 3(3), a ratio of the period T3 in which the waveform rises (on) to the period T4 in which the waveform falls (off) is T3:T4, and the duty ratio is T3/(T3+T4) (since T3=T4 in FIG. 3(3), the duty ratio is 50%). With respect to such a waveform, the pulse duty control which adjusts the period T3 to adjust the duty ratio is adopted to the driving section 20. When the on time is made longer, the driving section 20 makes the period T3 longer to increase the duty ratio, and when the on time is made shorter, the driving section 20 makes the period T3 shorter to decrease the duty ratio. For example, at the duty ratio of 50%, when the on time is made longer, the driving section 20 performs the modulation which allows the duty ratio to have a value larger than 50%, and when the on time is made shorter, the driving section 20 performs the modulation which allows the duty ratio to have a value smaller than 50%.

The driving section 20 performs such a pulse modulation: (1) Since a wave height value of the rectangular waves is not changed, the voltage applied to the electron emitting device is not changed, so that an insulation breakdown is hard to occur. (2) Even when the on time becomes longer, the voltage is not applied continuously to the electron emitting device, so that the breakdown of the electron emitting device caused by a direct current voltage is hard to occur. (3) Since the period in which the voltage of the low frequency signal 201 is not applied is provided in fixed time even when the pulse modulation is performed, electrons captured into the particle layer 3 within the time can be removed (or be allowed to disappear), so that an electric field which accelerates electrons in the particle layer 3 cannot be locally released.

Example

Using the electron emitting device described above, an experiment for confirming its effect was conducted. The electron emitting device used in the experiment was manufactured as follows.

(Manufacture of the Insulator Thin Film Having the Opening and the Predetermined Shape)

First, into a 10-ml reagent bottle, 0.7 g of an n-hexane solvent was poured, and then, 0.35 g of a silicone resin solution was poured thereinto. The mixture was stirred manually to obtain a silicone resin dilution solution. In this case, as the silicone resin, the SR 2411 silicone resin of a room temperature and humidity curing type (Dow Corning Toray Silicone Co., Ltd.) was used.

Next, an aluminum substrate of 24 mm square was prepared as the electrode substrate 2, the silicone resin dilution solution was dropped, and then a silicone resin layer was formed on the entire surface of the substrate by using a spin coating method. The film formation by the spin coating method was performed by dropping the dilution solution onto the surface of the substrate while the aluminum substrate was being rotated for one second at 500 RPM, followed by rotation for 10 seconds at 3000 RPM. Further, the aluminum substrate was subjected to a heating and curing process for 15 minutes using a hot plate at 200° C.

Next, a mask pattern which was pattern drawn by chrome onto a quartz thin plate was overlapped onto the substrate, followed by irradiation with a vacuum ultraviolet ray of a wavelength of 172 nm for 15 minutes. The chrome mask pattern has a square shape of 1.4 mm square. Here, when irradiated with the ultraviolet ray, the pattern drawn to the mask is pattern transferred with different film curing degrees of the silicone resin film. A portion which has been irradiated with the ultraviolet ray becomes a hard film as compared with a portion which has not been irradiated with the ultraviolet ray. As a light source of the vacuum ultraviolet ray, a dielectric barrier discharge excimer lamp (Ushio Inc.) was used.

Further, the surface of the substrate which has been irradiated with the ultraviolet ray was wiped with a soft waste to remove only the silicone resin film in the portion not irradiated with the ultraviolet ray, thereby forming a window of the silicone resin film of 1.4 mm square (an exposed portion of the surface of the aluminum substrate).

(Formation of the Particle Layer (Electron Acceleration Layer))

A 1.5-g n-hexane solvent was poured into a 10-ml reagent bottle, and then, 0.25-g silica particles were added thereinto as the insulating particles so as to be distributed by setting the reagent bottle on an ultrasonic distributor. Here, the silica particles are the fumed silica C413 (Cabot Corporation) having an average particle diameter of 50 nm, and have surfaces subjected to a hexamethyldisilazane process. The reagent bottle was set on the distributor for 5 minutes, so that the silica particles were distributed into an opaque white color in the hexane solvent. Next, 0.06-g silver nanoparticles were added thereinto as the conductive particles, and were then subjected to the ultrasonic distribution process in the same manner. The silver nanoparticles have an average particle diameter of 10 nm and an alcoholate insulation coating (Applied Nanotechnology Research Institute). The solution thus obtained is referred to as a distribution solution A. Likewise, a 1.5-g n-hexane solvent was poured into a 10-ml reagent bottle, and then, 0.25-g silica particles of the fumed silica C413 were added thereinto as the insulating particles so as to be distributed by setting the reagent bottle on the ultrasonic distributor in the same manner. Next, a 0.036-g silicone resin solution was poured, and was then subjected to the ultrasonic distribution process in the same manner. The silicone resin is the SR2411 silicone resin of a room temperature and humidity curing type (ditto). The solution thus obtained is referred to as a distribution solution B.

The distribution solution A was dropped onto the surface of the electrode substrate 2 formed with the window of the silicone resin film (the exposed portion of the surface of the aluminum substrate) to form the first particle layer 3A by using the spin coating method. The substrate formed with the first particle layer 3A was heated and dried for one minute by using the hot plate at 150° C. Further, the distribution solution B was used for a film formation in the same manner to form the second particle layer 3B. The substrate formed with the second particle layer 3B was heated and dried for one minute by using the hot plate at 150° C.

In the film formation by the spin coating method, the distribution solution was dropped onto the surface of the substrate while the substrate was being rotated for one second at 500 RPM, followed by rotation for 10 seconds at 3000 RPM.

(Formation of the Thin Film Electrode)

A 1.0-g ethanol solvent was poured into a 10-ml reagent bottle, and then, 0.1-g silica particles were added thereinto as spherical shield substances so as to be distributed for 5 minutes by setting the reagent bottle on the ultrasonic distributor. In this case, as the silica articles, the fumed silica SE-5V (Tokuyama Corporation) having an average particle diameter of 8 μm was used. The silica particles have surfaces subjected to a hexamethyldisilazane process in addition to an amino silane process. The distribution solution thus obtained is referred to as a distribution solution C.

Next, the distribution solution C was dropped onto the aluminum electrode substrate 2 formed with the particle layer 3 to uniformly scatter the spherical shield substances by using the spin coating method. The substrate after the scattering was heated for one minute by using the hot plate at 150° C. to vaporize the solvent.

Thereafter, a metal mask (a square shape of 2.0 mm square) following a shape of the thin film electrode 4 was stacked onto the electrode substrate 2 on which the spherical shield substances are scattered. At this time, an alignment adjustment was performed so that a center of the window of the previously formed insulator thin film 5 (the portion in which the surface of the aluminum substrate and the electron acceleration layer 3 are stacked directly) coincides with a center of the metal mask, and that an end of the metal mask and an end configuring the window of the insulator thin film 5 are away from each other by 0.3 mm at each side.

Next, after the metal mask was fixed, a carbon film was deposited by using an electric resistance heating type depositing machine, followed by a film formation by using a gold-palladium target (Au—Pd) with the sputtering apparatus, thereby obtaining a base electrode film of the porous electrode layer 8A. A film thickness of an α-carbon film 7 is 10 nm, and a film thickness of the gold-palladium electrode film is 20 nm.

Thereafter, dry air was blown onto the surface of the electrode film to remove the spherical shield substances. The porous electrode layer 8A was thus obtained. (When the spherical shield substances were blown away to observe the surface, holes having a diameter of 4.5 μm were formed in the surface of the electrode film at a density of 930 pieces/mm$^2$).

Finally, the metal mask was provided in the previous position to form the non-porous electrode layer 8B including only the metal material on the entire surface of a porous stack electrode layer 4-1 without the spherical shield substances, by using the gold-palladium target (Au—Pd). A film thickness of the non-porous electrode layer 8B is 20 nm.

The manufactured electron emitting device was driven in an environment in an atmosphere (25° C., 35%/RH) for evaluation. In the driving, when the electron emitting device was driven by a direct current, a direct current voltage source was used, and when the electron emitting device was driven by rectangular waves, the electron emitting device was driven by applying a voltage using the pattern generator, as described in the embodiment. The electron emission ampere meter 17B shown in FIG. 1 was used to measure electron emission amounts of the electron emitting device. Further, an electric current amount in the electron emitting device was monitored by the electron emission ampere meter 17A, if necessary. These results are shown in FIGS. 4 to 10.

Figure 5:
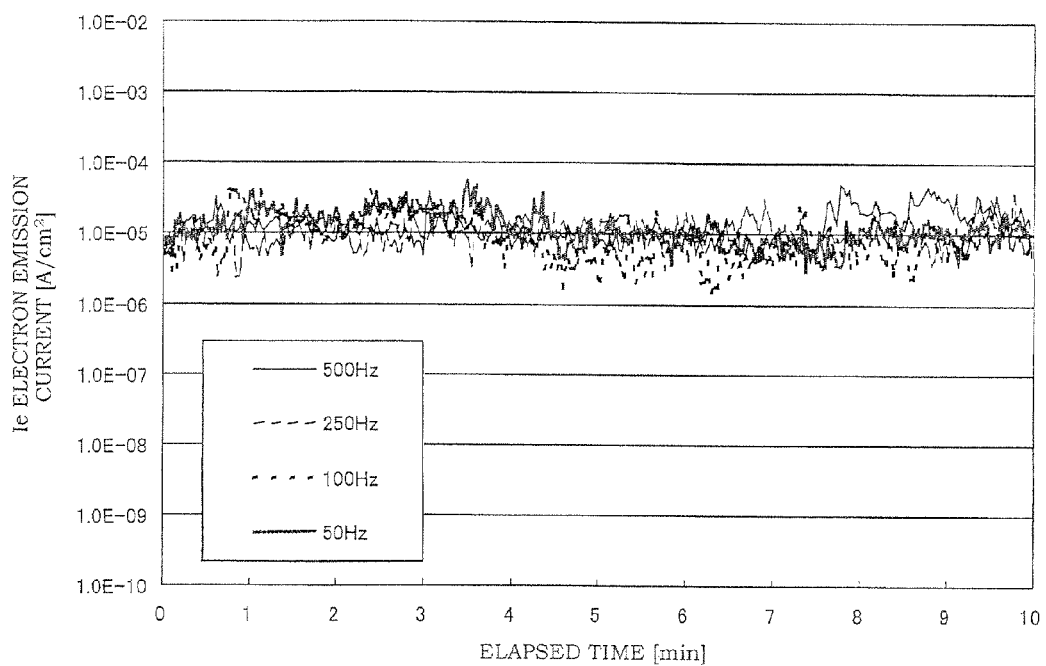
FIG. 5 is a graph showing changes in electron emission amounts with time when the electron emitting device according to the embodiment of the present invention is driven by rectangular waves at 50 Hz to 500 Hz (a duty ratio of 50%)
Figure 6:
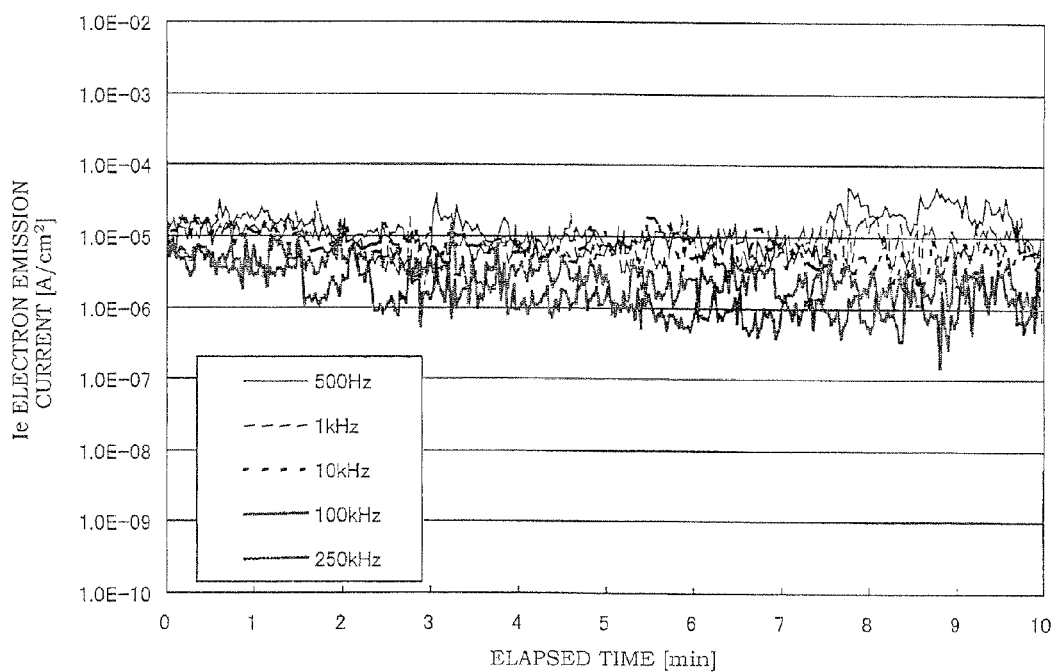
FIG. 6 is a graph showing changes in electron emission amounts with time when the electron emitting device according to the embodiment of the present invention is driven by rectangular waves at 500 Hz to 250 kHz (a duty ratio of 50%)

In the measurement of these values, the current measurement value when an alternating current voltage is applied is obtained by measurement through the rectangular waves on and off times and averaging the measurement values. For example, measurement integration time $t_m$ in a measuring device in FIGS. 5 and 6 is 167 [msec]. When an alternating current voltage of 50 Hz is applied, the current measurement value is an average current amount when about eight waves are applied.

Figure 4:
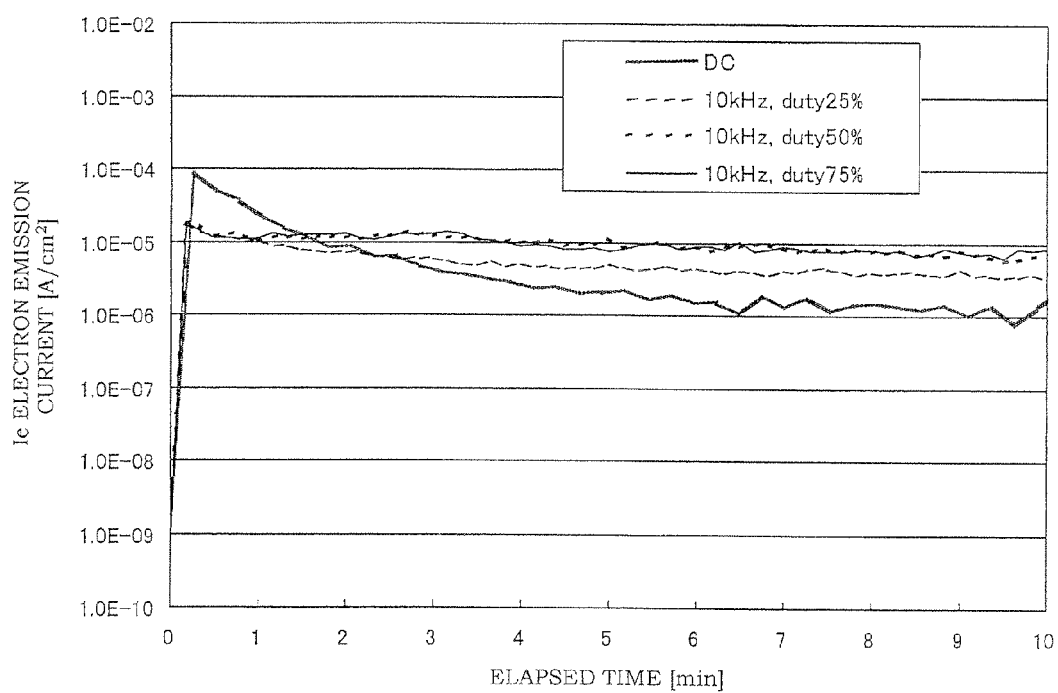
FIG. 4 is a graph showing a change in an electron emission amount with time when the electron emitting device according to the embodiment is driven by a direct current voltage and changes in electron emission amounts with time when the electron emitting device is driven by rectangular waves at 10 kHz, in which the changes when the electron emitting device is driven by the rectangular waves at 10 kHz are shown under three conditions when duty ratios are 25%, 50%, and 75%.

FIG. 4 is a graph showing a change in an electron emission amount with time when the electron emitting device according to the embodiment is driven by a direct current voltage and changes in electron emission amounts with time when the electron emitting device is driven by rectangular waves at 10 kHz. The changes when the electron emitting device is driven by the rectangular waves at 10 kHz are shown under three conditions of duty ratios being 25%, 50%, and 75%. In FIG. 4, "DC" shows that the electron emitting device is driven by the direct current voltage, and "10 kHz, duty ratio of 25%" shows that the electron emitting device is driven by the rectangular waves at 10 kHz at a duty ratio of 25%. A numerical value indicated following "duty" is a duty ratio under each of the conditions. A direct current voltage ($V_e$) is −16.0(V), and a wave height ($V_e$) of the rectangular waves is also −16.0 ($V_{O-P}$). The electron emitting device is driven at each of the voltages in an environment in an atmosphere (25° C., 35%/RH).

Referring to FIG. 4, it is found that when the electron emitting device is driven by the direct current voltage (DC in FIG. 4), the electron emission current amount exceeds $1\times10^{-4}$ (A/cm$^2$) immediately after the electron emitting device starts to be driven, is decreased gradually, and is lowered to $1\times10^{-6}$ (A/cm$^2$) after 10 minutes.

Further, it is found that when the electron emitting device is driven by the rectangular waves at 10 kHz ("10 kHz, duty ratio of 25%", "10 kHz, duty ratio of 50%", and "10 kHz, duty ratio of 75%" in FIG. 4), the electron emission current amount is reduced with an elapse of time, as in the case where the electron emitting device is driven by the direct current voltage.

The electron emission current amount immediately after the electron emitting device starts to be driven is slightly smaller when the electron emitting device is driven by the rectangular waves at 10 kHz than when the electron emitting device is driven by the direct current voltage, but the reduced electron emission current amount with time is smaller when the electron emitting device is driven by the rectangular waves at 10 kHz than when the electron emitting device is driven by the direct current voltage. It is considered that the reduction in the electron emission current amounts with time occurs due to a capture of electrons into the particle layer (electron acceleration layer), not due to a breakdown of the electron emitting device. However, it can be understood that the electron emitting device is driven more preferably by the rectangular waves rather than by the direct current voltage.

Next, a relation between the frequencies of the driving conditions of the rectangular waves and the reduction in electron emission current amounts was further examined. The results are shown in FIGS. 5 and 6.

FIG. 5 is a graph showing changes in electron emission amounts with time when the electron emitting device according to the embodiment of the present invention is driven by rectangular waves at 50 Hz to 500 Hz (a duty ratio of 50%). FIG. 6 is a graph showing changes in electron emission amounts with time when the electron emitting device according to the embodiment of the present invention is driven by rectangular waves at 500 Hz to 250 kHz (a duty ratio of 50%). The frequencies indicated in the respective figures show the frequencies of the rectangular waves. In FIG. 5, the frequencies of the rectangular waves are 50 Hz, 100 Hz, 250 Hz, and 500 Hz and changes in electron emission amounts with time at the respective frequencies are shown. In FIG. 6, the frequencies are 500 Hz, 1 kHz, 10 kHz, 100 kHz, and 250 kHz. Also in the experiments of FIGS. 5 and 6, a wave height ($V_e$) of the rectangular waves is −16.0 ($V_{O-P}$), and each driving of the electron emitting device was performed in an atmosphere (25° C., 35%/RH).

Referring to FIG. 5, it is found that when the electron emitting device is driven by the rectangular waves at 50 Hz to 500 Hz, the electron emission amounts are hardly reduced.

Referring to FIG. 6, it is found that when the electron emitting device is driven by the rectangular waves at 500 Hz and 1 kHz, the electron emission amounts are hardly reduced, but when the frequency is 10 kHz or more, the electron emission amounts are reduced. In these experiments, t is found that at the highest frequency of 250 kHz, the electron emission amount is most reduced.

From these results, it can be understood that when the electron emission amounts are harder to be reduced (or are not reduced) when the electron emitting device is driven by the periodic rectangular waves, that is, an alternating current voltage, rather than when the electron emitting device is driven by the direct current voltage. It is considered that when the electron emitting device is driven by such an alternating current voltage, there is a period in which the voltage is not applied to the particle layer, so that electrons captured into the particle layer (electron acceleration layer) are removed (or are allowed to disappear).

It can be understood that when the electron emitting device is driven by the alternating current voltage, an upper limit of its frequency is 10 kHz. It is considered that when the frequency is 10 kHz or more, the conductor skin effect in which the particle surfaces in the particle layer serve as a current path becomes significant, with the result that the Joule heat due to an electric current concentration causes a reduction in the electric current amount in the device and a reduction in the electron emission amount followed thereby.

Even when the electron emitting device is driven by the alternating current voltage, which is close to the driving by the direct current voltage, an electromigration of the material for the substrate electrode tends to occur to cause a physical breakdown of the electron acceleration layer. This phenomenon is associated with a voltage value, a magnitude of an electric current amount in the device, a humidity in an atmosphere, and the like in addition to a frequency. Assuming the condition of this example, it is found that when the electron emitting device is driven by the alternating current voltage of 100 Hz, the electromigration can be prevented effectively.

Next, of these results, studied was whether there is any driving condition in which the electron emission amount is hard to be reduced (or is not reduced) at the upper limit frequency of 10 kHz. The results are shown in FIGS. 7 and 8.

Figure 7:
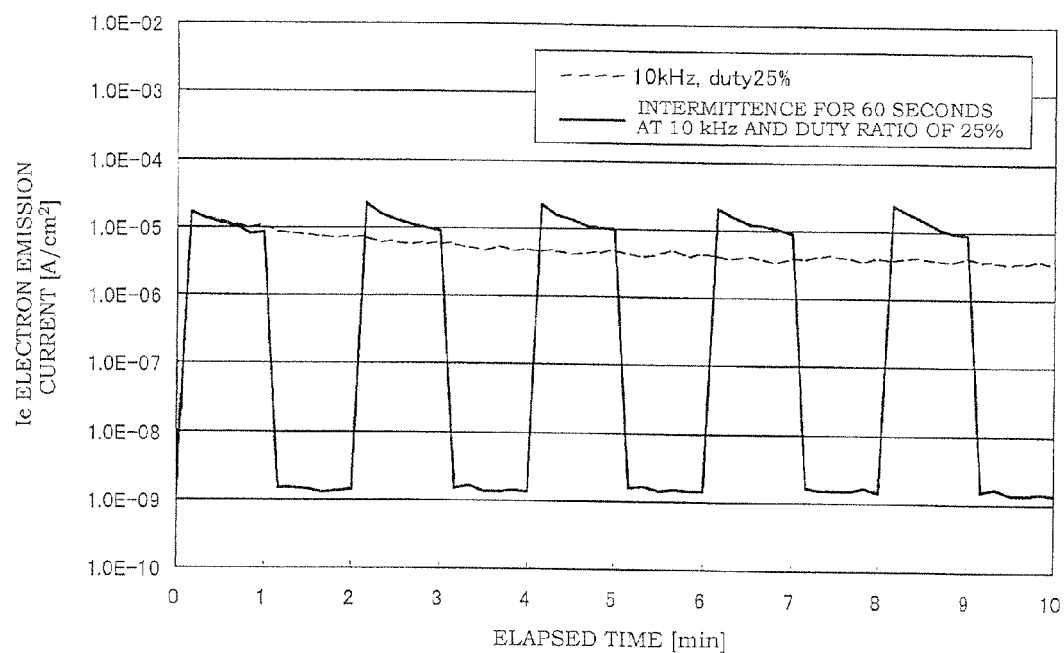
FIG. 7 is a graph showing a change in an electron emission amount when the electron emitting device according to the embodiment of the present invention is driven by continuously applying rectangular waves at 10 kHz (a duty ratio of 25%) and a change in an electron emission amount when the electron emitting device according to the embodiment of the present invention is driven by intermittently applying similar rectangular waves at intervals of 60 seconds.

FIG. 7 is a graph showing a change in an electron emission amount when the electron emitting device according to the embodiment of the present invention is driven by continuously applying rectangular waves at 10 kHz (a duty ratio of 25%) and a change in an electron emission amount when the electron emitting device according to the embodiment of the present invention is driven by intermittently applying same rectangular waves at intervals of 60 seconds. FIG. 8 is a graph showing changes in electron emission amounts when the electron emitting device according to the embodiment of the present invention is driven by intermittently applying rectangular waves at 10 kHz (a duty ratio of 50%) at intervals of 10, 5, and 2.5 seconds, respectively. Here, "intermittence for 60 seconds at 10 kHz at duty ratio of 25%" shows a cycle in which rectangular waves at 10 kHz (a duty ratio of 25%) are applied for 60 seconds (called a voltage applying period) and then are not applied for 60 seconds (called a voltage stopping period), and in this case, shows a cycle including the voltage applying period and the voltage stopping period at intervals of 60 seconds (a cycle of 120 seconds), that is, at a frequency of 0.008 Hz.

Figure 8:
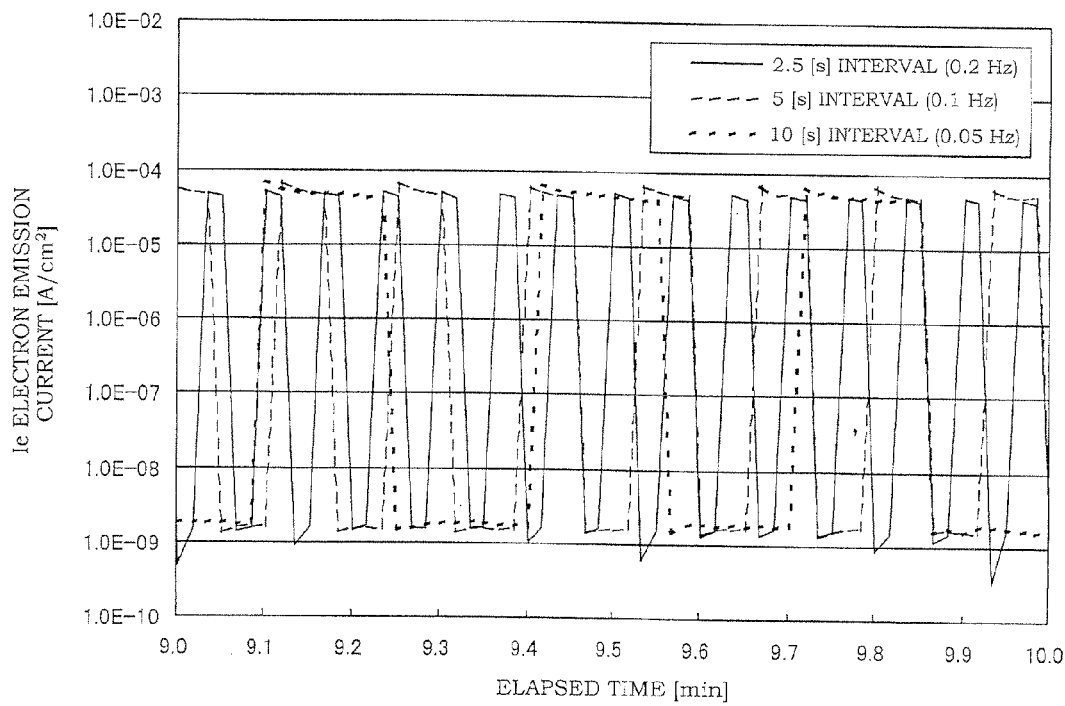
FIG. 8 is a graph showing changes in electron emission amounts when the electron emitting device according the embodiment of the present invention is driven by intermittently applying rectangular waves at 10 kHz (a duty ratio of 50%) at intervals of 10, 5, and 2.5 seconds, respectively.

A numerical value such as "10 [s] interval (0.1 Hz)" in FIG. 8 indicates an interval and a period of this cycle. FIG. 8 shows changes in electron emission amounts when 9 to 10 minutes elapse after the driving is started. In the experiments of FIGS. 7 and 8, a wave height ($V_e$) of the rectangular waves is −16.0 ($V_{O-P}$), and each driving of the electron emitting device was performed in an environment in an atmosphere (25° C., 35%/RH).

Referring to FIG. 7, it is found that unlike the case where the electron emitting device is driven by continuously applying the rectangular waves, when the electron emitting device is driven by intermittently applying rectangular waves at intervals of 60 seconds, the electron emission amount is hardly reduced. From this result, it can be understood that the cycle in which the rectangular waves are applied for 60 seconds and then are not applied for 60 seconds can eliminate a release of an electric field due to captured electrons so as to maintain the electron emission of the electron emitting device.

Referring to FIG. 8, it is found that the electron emission amounts are hardly changed at any one of intervals of 10, 5, and 2.5 seconds (at any one of the frequencies of 0.05 Hz, 0.1 Hz, and 0.2 Hz).

From these results, it is found that when the cycle described above has a frequency of 0.008 Hz to 0.2 Hz, the electron emission amounts of the electron emitting device are stable.

Further, in order to find the upper limit of the frequency of the cycle described above, an aging test (100-hour continuous operation) was conducted in an atmosphere (25° C., 35%/RH). Its conditions results are shown in FIGS. 9(1), 9(2), and 10.

Figure 10:
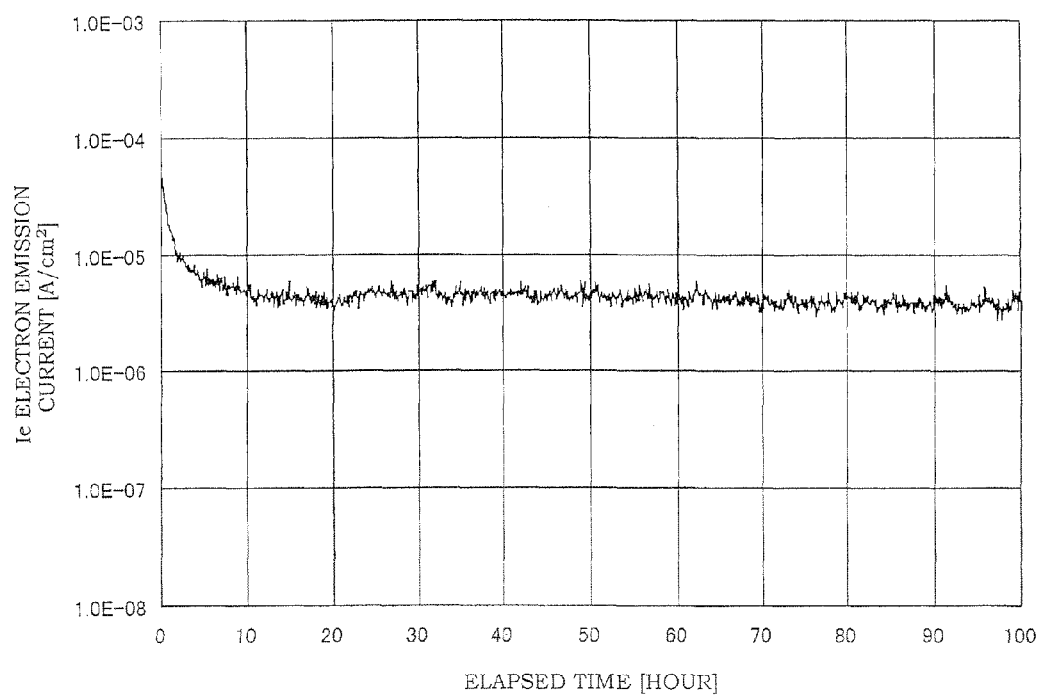
FIG. 10 is a graph showing results of the aging test (100-hour continuous operation) of the electron emitting device according to the embodiment of the present invention.

FIGS. 9(1) and 9(2) are waveform charts of assistance in explaining a pulse wave number map of a pulse density control used when the electron emitting device according to the embodiment of the present invention is subjected to the aging test (100-hour continuous operation), and a control method thereof. FIG. 10 is a graph showing results of the aging test (100-hour continuous operation) of the electron emitting device according to the embodiment of the present invention.

In the aging test, the electron emitting device was driven in a cycle in which the rectangular waves at 10 kHz (a duty ratio of 25%, a wave height ($V_e$) of −16.0 ($V_{O-P}$)) were applied for 0.25 seconds and then were not applied for 0.25 seconds. In other words, the voltage applying period was provided at intervals of 0.25 seconds (a period of 0.5 seconds) to drive the electron emitting device in the cycle including the voltage applying period and the voltage stopping period at a frequency of 2 Hz, thereby conducting the aging test.

In the driving of the electron emitting device, an electric current in the electron emitting device was measured (by the electron emission ampere meter 17B shown in FIG. 1) to perform the pulse density modulation by monitoring a measurement value thereof.

Referring to FIG. 9(1), the pulse density modulation was performed by changing a wave number in the voltage applying period and a wave number in the voltage stopping period based on e.g., an output ratio of 50% (horizontal axis), a wave number in the voltage applying period of 1 (left vertical axis), and a wave number in the voltage stopping period of 1 (right vertical axis). In FIG. 8, in the voltage applying period, ½ time of a wavelength=a wave number in the voltage applying period of 1 is defined, and in the voltage stopping period, ½ time of a wavelength=a wave number in the voltage stopping period of 1 is defined, which in this case, correspond to the output ratio of 50% of the rectangular waves at 10 kHz. At the output ratio of 50% (horizontal axis), the wave number in the voltage applying period of 1 (left vertical axis), and the wave number in the voltage stopping period of 1 (right vertical axis), the output of the rectangular waves can be increased by the output ratio of 50%, or can be decreased by the output ratio of 50%. Referring to FIG. 8, for example, in order that the output of the rectangular waves is increased to raise the output ratio to 60%, the wave number in the voltage applying period is 2, and the wave number in the voltage stopping period is 1.3, which can be read from the pulse wave number map of FIG. 9(1). On the contrary, in order that the output of the rectangular waves is decreased to lower the output ratio to 40%, the wave number in the voltage applying period is 1, and the wave number in the voltage stopping period is 1.5, which can be read from this figure. In this way, the pulse density modulation is enabled to the desired output ratio from the pulse wave number map of FIG. 9(1).

In the aging test, an increase or decrease amount Δ is calculated from the measured data of the electric current in the electron emitting device (the measured data of the electron emission ampere meter 17A shown in FIG. 1) to obtain the output value of the rectangular waves as a function of the increase or decrease amount Δ. In this case, the function is determined according to the characteristics of the device and the method of setting the output control range of the rectangular waves. Such a pulse density modulation was used to conduct the aging test.

Referring to FIG. 10, it is found that a stable electron emission is continued over a long period of time of 100 hours even in an atmosphere (25° C., 35%/RH).

From the above results, it is apparent that when the cycle has a frequency of 0.008 Hz to 2 Hz, a stable electron emission can be continued over a long period of time even in the atmosphere.

In the electron emitting device and the electron emitting device driving method according to the present invention, the device which can stably emit electrons over a long period of time in an atmosphere and the driving method thereof are provided. Further, the device which can be driven for a long period of time in an atmosphere and the driving method thereof are provided. Therefore, the present invention is applicable to a charging device of an image forming apparatus such as an electrophotographic type copying machine, a printer, and a facsimile, as well as to an electron curing device. The present invention which is combined with a light emitter is applicable to an image displaying device, and the present invention which is combined with an air blower is applicable to an air blower generating ion wind to cool a substance to be cooled. For example, electrons emitted from the electron emitting device according to the present invention can be collided with a phosphor for light emission.

What is claimed is:

1. A driving method of an electron emitting device which includes a first electrode, a particle layer formed on the first electrode and including insulating particles, and a second electrode formed on the particle layer, comprising:
    applying a voltage between the first and second electrodes to emit electrons from the first electrode so that the electrons are accelerated through the particle layer and emitted from the second electrode,
    wherein the applied voltage includes pulses which have a first frequency and are oscillated at a second frequency lower than the first frequency.

2. The driving method of claim 1, wherein the first frequency is 100 Hz to 10 kHz and the second frequency is 0.008 Hz to 2 Hz, each of the pulses being configured of a rectangular wave.

3. The driving method of claim 1, wherein further comprising:
    measuring an electric current between the first electrode and the second electrode, and
    modulating the pulses based on the measured electric current to make an electron emission amount of the electron emitting device constant.

4. The driving method of claim 3, wherein the step of modulating the pulses is performed by a pulse density modulation or a pulse width modulation.

5. An electron emitting device comprising:
    a first electrode,
    a particle layer formed on the first electrode and including insulating particles,
    a second electrode formed on the particle layer, and
    a driving section for applying a voltage between the first and second electrodes to emit electrons from the first electrode so that the electrons are accelerated through the particle layer and emitted from the second electrode, wherein the applied voltage includes pulses which have a first frequency and are oscillated at a second frequency lower than the first frequency.

6. The electron emitting device of claim 5, wherein the first frequency is 100 Hz to 10 kHz, the second frequency is 0.008 Hz to 2 Hz, and the pulses are configured of rectangular waves.

7. The electron emitting device of claim 5, wherein the driving section includes an electric current measuring section which measures an electric current between the first and second electrodes, and a pulse modulating section which modulates the pulses based on the measured electric current to make an electron emission amount of the electron emitting device constant.

8. The electron emitting device of claim 7, wherein the pulse modulating section modulates the pulses by a pulse density modulation or a pulse width modulation.

9. The electron emitting device of claim 5, further comprising an insulating layer formed on the first electrode and having an opening, wherein a part of the second electrode is formed above the insulating layer and be arranged so as to face the first electrode through the opening and the other part overlaps with the insulating layer, and the particle layer is arranged between the first and second electrodes and between the second electrode and the insulating layer and includes insulating particles and conductive particles.

10. The electron emitting device of claim 9, wherein the insulating layer is formed so as to be contacted with the first electrode.

11. The electron emitting device of claim 9, wherein the insulating layer is made of a silicone resin.

12. The electron emitting device of claim 9, wherein the second electrode has a surface with a recess portion.

13. The electron emitting device of claim 9, wherein the second electrode includes a first electrode layer adjacent to the particle layer and a second electrode layer formed on the first electrode layer and having a resistance value higher than that of the first electrode layer, the second electrode layer having a surface with a recess portion.

14. The electron emitting device of claim 13, wherein the second electrode layer is electrically connected to the particle layer by passing the recess portion through the first electrode layer.

15. The electron emitting device of claim 13, wherein the first electrode layer comprises an amorphous carbon layer.

16. The electron emitting device of claim 13, wherein the second electrode layer comprises a metal layer.

17. The electron emitting device of claim 16, wherein the second electrode layer comprises a material including at least one of gold, silver, tungsten, titanium, aluminum, and palladium.

18. The electron emitting device of claim 9, wherein the particle layer comprises an insulating particle layer including insulating particles.

19. The electron emitting device of claim 9, wherein the insulating particles and conductive particles configuring the particle layer are fixed by a silicone resin.

20. The electron emitting device of claim 9, wherein the conductive particles comprises a material including at least one of gold, silver, platinum, palladium, and nickel, and have an average particle diameter of 3 to 20 nm.

21. The electron emitting device of claim 9, wherein the insulating particles comprises a material including at least one of $SiO_2$, $Al_2O_3$, and $TiO_2$, and have an average particle diameter of 10 to 1000 nm.

* * * * *